United States Patent
Hender et al.

(10) Patent No.: US 10,613,014 B2
(45) Date of Patent: Apr. 7, 2020

(54) METHOD FOR AUTOMATING CONTROL SYSTEMS FOR PERFORMING A COMPLEX TRANSIENT PERMEABILITY TEST

(71) Applicant: New England Research, Inc., White River Jct., VT (US)

(72) Inventors: Steven H. Hender, White River Jct., VT (US); Gregory Naff Boitnott, Hanover, NH (US)

(73) Assignee: New England Research, Inc., White River Jct., VT (US)

(*) Notice: Subject to any disclaimer, the term of this patent is extended or adjusted under 35 U.S.C. 154(b) by 0 days.

(21) Appl. No.: 15/878,928

(22) Filed: Jan. 24, 2018

(65) Prior Publication Data
US 2018/0209891 A1 Jul. 26, 2018

Related U.S. Application Data

(60) Provisional application No. 62/450,512, filed on Jan. 25, 2017.

(51) Int. Cl.
*G01N 15/08* (2006.01)

(52) U.S. Cl.
CPC ..... *G01N 15/0826* (2013.01); *G01N 15/0806* (2013.01)

(58) Field of Classification Search
CPC .................................................. G01N 15/0826
USPC ................................................................ 73/38
See application file for complete search history.

(56) References Cited

U.S. PATENT DOCUMENTS

| | | | | |
|---|---|---|---|---|
| 4,555,934 A | * | 12/1985 | Freeman | G01N 15/0826 73/38 |
| 6,324,898 B1 | * | 12/2001 | Cote | B01D 65/102 210/90 |
| 6,568,282 B1 | * | 5/2003 | Ganzi | B01D 65/102 73/38 |
| 7,210,335 B2 | * | 5/2007 | Gupta | G01N 15/088 73/38 |
| 2015/0293007 A1 | * | 10/2015 | Ramakrishnan | G01N 15/088 73/38 |

* cited by examiner

*Primary Examiner* — Paul M. West
*Assistant Examiner* — Mark A Shabman
(74) *Attorney, Agent, or Firm* — Richard A. Fagin

(57) ABSTRACT

An improved complex transient permeability measurement is described. The improvement allows a computer controlled measurement system to automatically adjust the time scale of the transient in order to produce reliable results. The automated method is an improvement on the previous trial and error method, allowing measurements to be more easily optimized and automated.

20 Claims, 3 Drawing Sheets

METHOD FOR AUTOMATING CONTROL SYSTEMS FOR PERFORMING A COMPLEX TRANSIENT PERMEABILITY TEST

CROSS REFERENCE TO RELATED APPLICATIONS

Priority is claimed from U.S. Provisional Application No. 62/450,512 filed on Jan. 25, 2017 and which is incorporated herein by reference in its entirety.

STATEMENT REGARDING FEDERALLY SPONSORED RESEARCH OR DEVELOPMENT

Not Applicable

NAMES OF THE PARTIES TO A JOINT RESEARCH AGREEMENT

Not Applicable.

BACKGROUND

This disclosure relates to the field of analysis of physical properties of porous materials. More specifically, the disclosure relates to the methods for measuring the property of permeability of porous materials. Permeability is an important physical property for many fields of study. As related to this disclosure, one important field of study involving porous materials is the petroleum industry. Characterization of Earth formations is important to the industry particularly with reference to the ability to predict fluid production from such formations.

Darcy's Law is the fundamental law describing fluid flow through a porous medium. Much of the petroleum industry uses what is called the steady state method to measure permeability. This is a direct application of Darcy's Law. The steady state method involves setting a pressure differential across a sample of a formation. Because of this pressure differential, fluid will flow through the porous matrix of the sample. By measuring the flow rate (Q), the pressure at both ends of the sample (i.e., the pressure drop—$\Delta P$), and the sample geometry (L and A), it is simple to apply Darcy's Law to the measured flow rate, pressure drop and sample geometry to obtain the permeability (k). $\mu$ is the viscosity of the fluid, which is known or can be measured.

$$k = -\frac{L*Q}{A}\frac{\mu}{(\Delta P)} \quad (1)$$

Permeability can also be measured using techniques typically described as pressure transient techniques. Pressure transient techniques typically involve measuring the response to a transient in pressure where the sample is configured such that its permeability influences the response. An example of a boundary value problem used is when a cylindrical sample of known length and diameter is jacketed in an impermeable membrane and placed between two endcaps providing pore pressure access to each end of the sample. At one end of the sample, typically called the upstream end, a pore pressure is controlled or otherwise known. At the other end of the sample, typically called the downstream end, a known boundary condition is established such that the relationship between the volumetric flow through the boundary and pressure at the boundary is known. Within the sample, a governing equation is specified that relates pressure to flow within the sample where permeability is one of the parameters defining the governing equation. A common governing equation combines Darcy's law with the mass balance equation and can be written as:

$$(k/\eta)\partial^2 p/\partial x^2 = S\partial p/\partial t \quad (2)$$

where k is the sample permeability, $\eta$ is the fluid viscosity, p is the pressure, x is the position within the sample, S is the specific storage, and t is time.

One transient method known in the art is the complex transient method. In a common implementation of the complex transient method, the pressure at the upstream end of the sample of the sample is controlled, and the downstream end of the sample is connected to a known volume of pore fluid. The pressure at the downstream end of the sample is monitored as a function of time. The transfer function describing the relationship between the perturbation in pressure at the upstream end of the sample and the response measured at the downstream end of the sample is a function of the length (L), cross-sectional area (A), permeability (k), and specific storage (S) of the sample, the viscosity ($\eta$) and compressibility ($\beta$) of the fluid, and the volume (V) in communication with the bottom of the sample. Provided that the sample dimensions, and fluid properties are known, the permeability and specific storage of the sample can be determined by measurement of the pressure response at the downstream end of the sample in response to the controlled pressure at the upstream end of the sample.

In the absence of specific storage of the sample, or equivalently if the storage capacity of the sample is small compared to the storage capacity of the down-stream reservoir, the governing equation simplifies to that of Darcy's Law. In this limiting case, the measurement of permeability is relatively straightforward using accepted analytical solutions.

For the case where specific storage of the sample is sufficiently large to measurably influence the pressure response, the analysis becomes more difficult. While analytical solutions to the re-equilibration process are available in a number of forms, in the general case there is no closed-form expression to compute permeability from the equilibration process. In such cases, the permeability and specific storage are determined by iterative comparison with model predictions. The permeability and specific storage are determined by finding the values of permeability and specific storage that produce the best fit to the measured response.

A common assumption relating the specific storage to the fluid properties (e.g. fluid compressibility ($\beta$) and rock properties is to assume that $S=(\alpha+\beta\phi)$ where $\alpha$ is the pore volume compressibility of the rock and $\phi$, is the porosity of the rock. If $\alpha$ and $\beta$ are assumed known, the specific storage can be directly related to the sample porosity.

The complex transient method has several possible advantages over the steady state method and other transient methods.

First, the complex transient method is faster than the traditional steady-state flow technique. This is especially important for low permeability samples. As the permeability of the sample decreases, the required duration of a permeability test increases.

Second, the complex transient method can measure permeability without creating any net flow through the sample. This is preferable for some samples which would incur changing physical properties during large amounts of flow.

Third, the complex transient method allows for the possibility to measure the specific storage of the sample. The complex transient method makes use of a transient pressure response that in some cases is sensitive to both the permeability and the specific storage. When this is the case, the complex transient method allows for the simultaneous measurement of both permeability and specific storage.

Fourth, execution of a complex transient measurement can be optimized for a sample in response to the sample's permeability without the need to adjust the measurement apparatus. In the complex transient method, this optimization is performed by adjusting the timescale of the pressure transient controlled at the upstream end of the sample in order to obtain a desired response to the transient at the downstream end.

A requirement of the complex transient method known in the art is that the user needs to specify the time scale for the transient before performing the measurement. This is known to be performed largely on a trial and error basis: A measurement is performed with an arbitrarily chosen (or otherwise guessed) time scale; the quality of the measurement is analyzed; then the measurement is repeated using an adjusted time scale. Having an automated technique to determine an appropriate time scale as part of the measurement process itself may facilitate use of the complex transient method.

SUMMARY

According to one aspect, the disclosure relates to a method for determining permeability of a sample of an earthen formation. A method according to this aspect includes maintaining a starting pressure at a first end of the sample and at a second end of the sample. The second end of the sample is fluidly connected to a volume of pore fluid. A first change in pressure is induced at the first end of the sample. Pressure is measured at the second end of the sample until the measured pressure satisfies a first condition, upon which time measurement is stopped. A time duration between the starting and the stopping time is determined. A second change in pressure is induced at the first end of the sample. The second changed pressure is controlled at the first end of the sample for the calculated time duration. The pressure at the first end of the sample is returned to the starting pressure and is held until a second condition is satisfied. Measuring pressure at the second end of the sample is repeated and permeability is determined from the change in pressure at the first end of the sample, the calculated time duration and the measured values of the pressure at the second end of the sample.

In some embodiments, the first change in pressure approximates a constant value.

In some embodiments, the first condition is satisfied when a measurement of the pressure at the second end exceeds a selected value.

In some embodiments, the first condition is satisfied by comparison of measurement of the pressure at the second end with a prediction of the pressure at the second end using a mathematical model relating permeability to the predicted pressure.

In some embodiments, the mathematical model is also related to specific storage of the formation sample.

In some embodiments, the second condition is satisfied when observation that the second pressure no longer changes in response to the first and second pressure changes.

In some embodiments, the second condition is a predetermined value of time duration.

Other aspects and possible advantages will be apparent from the description and claims that follow.

DETAILED DESCRIPTION

Figure 1:
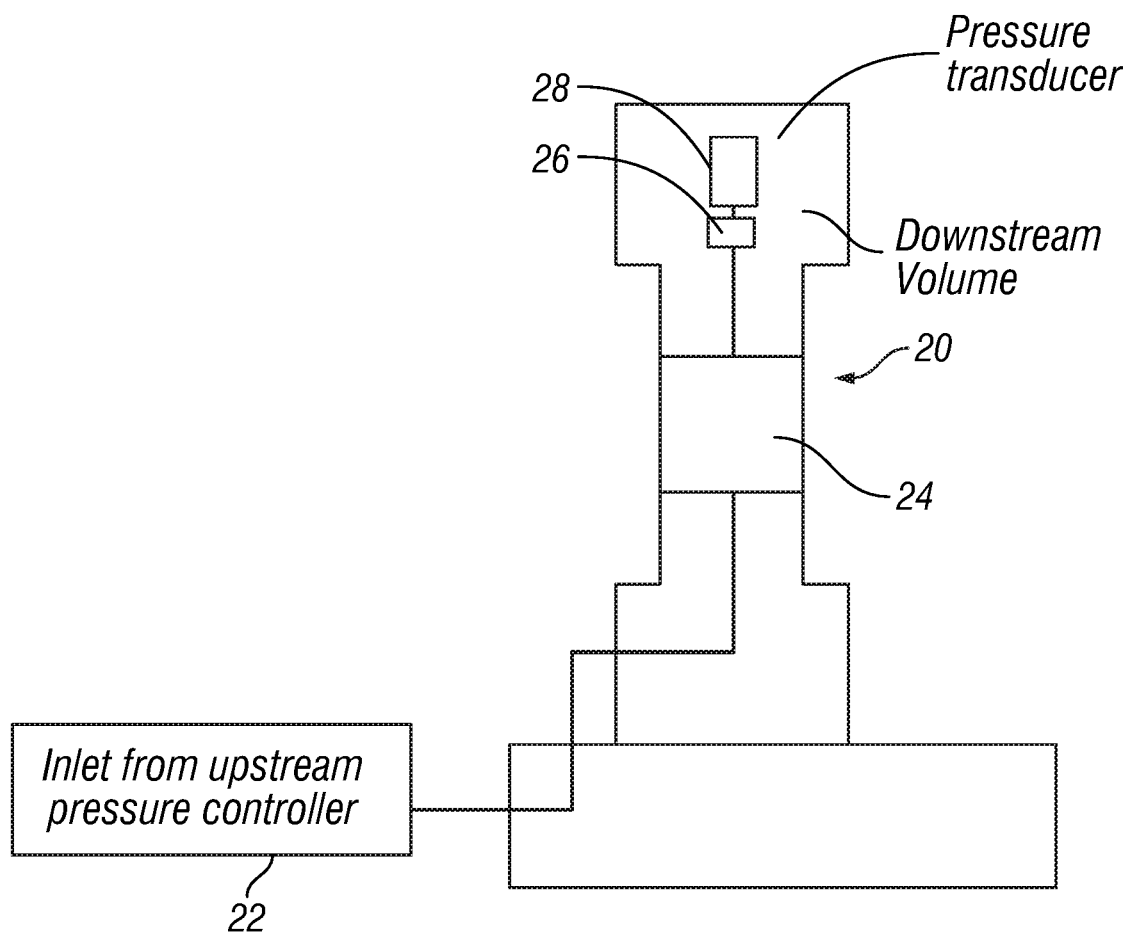
FIG. 1 shows an example embodiment of an apparatus used to make measurements according to the present disclosure.

An example embodiment of an apparatus that may be used to make measurements in accordance with the present disclosure is shown schematically in FIG. 1. The apparatus 20 may be based, for example, on a measurement apparatus made by New England Research, Inc., White River Jct., VT 05001 and identified by model designation AutoLab 1500. The apparatus 20 may comprise a holder for a sample of permeable medium, e.g., a sample 24 of an earthen formation, such as a drilled core sample. A downstream storage volume 26 having a pressure transducer(s) 28 in fluid communication therewith may be contained within a downstream "endcap" of the apparatus 20 and may be in fluid communication with the downstream end of the formation sample 24. In either case, to determine permeability, a pressure source 22 coupled to an opposed end (called the upstream end) of the formation sample 24 as the downstream end and coupled storage volume 26 may be operated in a manner so as to apply fluid pressure to the upstream end of the formation sample 24 in a known or predetermined relationship with respect to time. The fluid pressure may be measured at the downstream end of the formation sample 24 using the transducer 28. Initially, the upstream end and the downstream end of the formation sample 24 are in fluid pressure equilibrium with the fluid pressure in the formation sample 24. The fluid pressure at the upstream end of the formation sample 24 is then changed or perturbed by suitably controlling the pressure source 22. The pressure response (defined below) at the downstream end of the formation sample 24 is determined by measuring pressure at the downstream end with respect to time; the pressure measurements with respect to time may be used as will be further explained to determine permeability of the formation sample 24.

Figure 2:
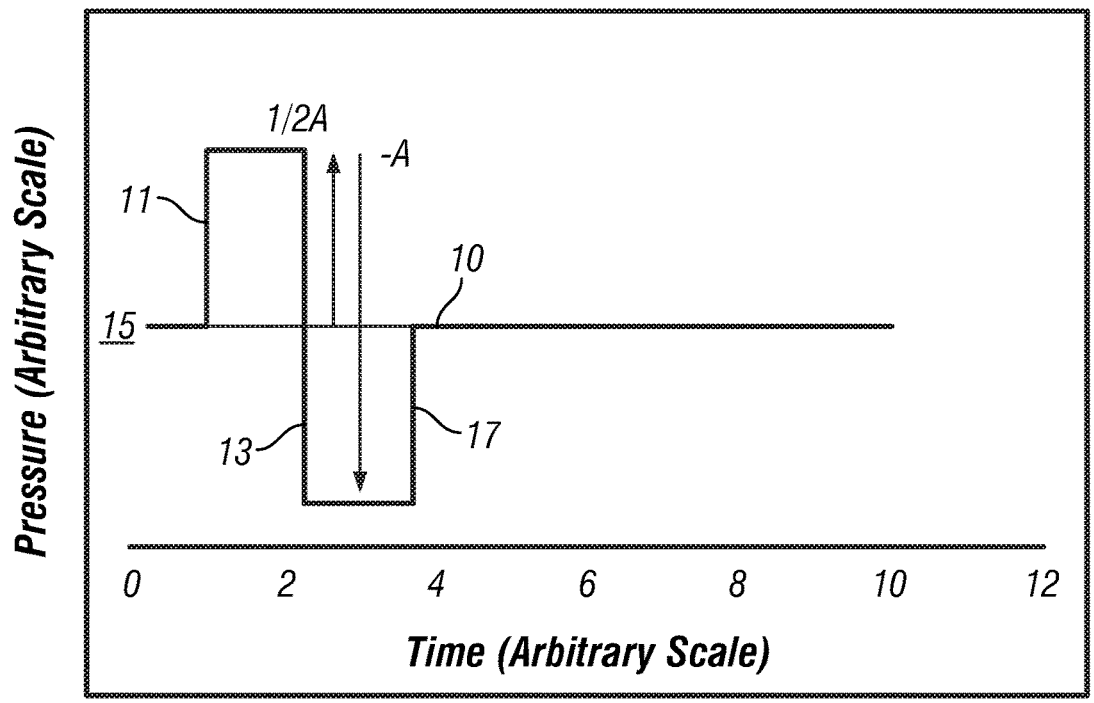
FIG. 2 shows a square wave source pressure pulse such as the one generated as the source for complex transient permeability tests.

FIG. 2 shows a graph with respect to time of pressure at the outlet of the pressure source (22 in FIG. 1, and, e.g., at the upstream end at of the formation sample as shown in FIG. 1) used to perturb fluid pressure in the formation sample (24 in FIG. 1) to enable making measurements according to the present disclosure. The graph in FIG. 2 shows a transient source pressure pulse at 10. An initial (or equilibrium) pressure at the start of a pressure pulse is shown at 15. In the example embodiment shown in FIG. 2, the transient is represented as a single cycle of a square wave. A square wave may have the advantage of being relatively easy to generate and control as contrasted with other forms of pressure perturbation. In some embodiments, such as shown in FIG. 2, pressure may be increased at 11 by an amount of ½ of a value defined below as a "Source Amplitude" A and held at that value for a selected time (thus being approximately constant for the selected time). After a selected amount of time, the pressure may be decreased by a second amount at 13. In the present example embodiment the second amount may be the amount A. After a second selected time, the pressure may be returned to the initial pressure at 17. The first pressure change at 11 and the second pressure change at 13 and the return at 15 may be in opposed sign to that shown in FIG. 2, i.e., first a decrease and then an increase in pressure followed by a decrease to return to the initial pressure.

Figure 3:
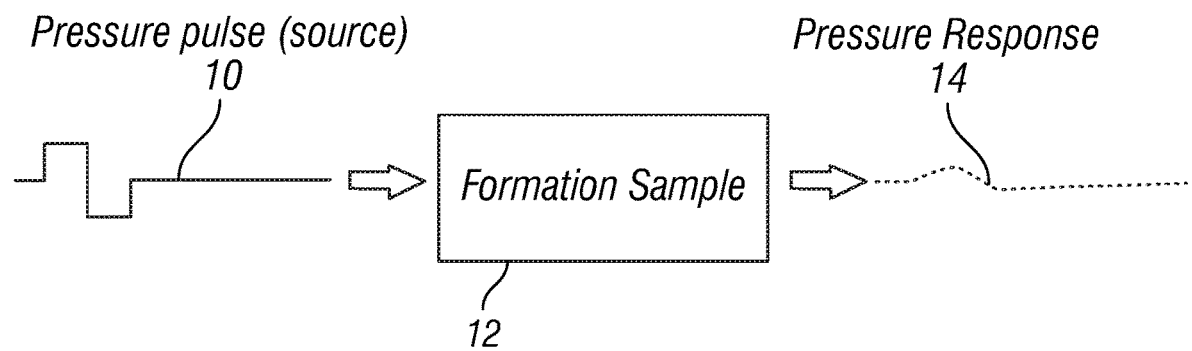
FIG. 3 shows a schematic of the source pressure pulse, flow through one end of a formation sample, and pressure response at the other end of the sample.

A schematic representation of making measurements of "pressure response" of a formation sample to a transient change in fluid pressure at the upstream end of the formation sample is shown in FIG. 3. Pressure perturbation, which in the present example embodiment may be in the form of a square wave transient pressure pulse 10 is applied to one end of a formation sample 12 as explained with reference to FIG. 2. The (square wave) pressure transient pulse 10 will propagate through the formation sample 12 in a manner related to the fluid transport properties of the formation sample, e.g., the specific storage and permeability, and the compressibility and viscosity of the fluid in the pore spaces of the formation sample. Pressure is measured at the other end of the formation sample 12, as explained above. The relationship with respect to time of the pressure as measured at the other end of the formation sample 12, as is shown at 14, may be referred to as the pressure response of the formation sample 12.

Figure 4:
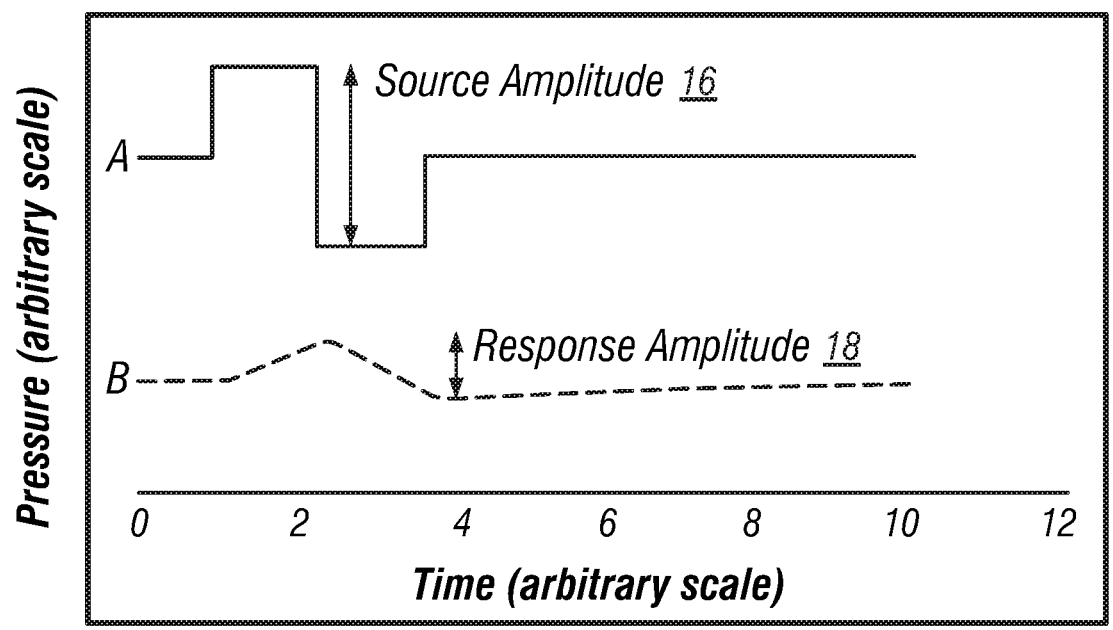
FIG. 4 shows source amplitude and the pressure response amplitudes.

FIG. 4 shows graphically what is meant by the term "Source Amplitude" at 16 and the term "Response Amplitude" at 18. The Source Amplitude may be defined as a ratio of the maximum value of pressure with respect to the minimum value of pressure, e.g., with respect to a baseline pressure, in any pressure pulse generated by the pressure source (22 in FIG. 1). A corresponding Response Amplitude may be calculated from the measured pressure at the downstream end of the formation sample. In methods according to the present disclosure it is possible to use a ratio of Response Amplitude with respect to the Source Amplitude to quality check the results. An amplitude ratio may be defined as follows.

$$\text{Amplitude Ratio} = (\text{Response Amplitude})/(\text{Source Amplitude}) \quad (2)$$

It has been determined empirically that there is a preferred value of Amplitude Ratio which leads to a robust result while also minimizing the time required for the pressure measurement at the downstream end of the sample. For a particular formation sample, the time duration of the transient pressure pulse may be set in order to obtain a desired Amplitude Ratio. A longer transient pressure pulse duration will result in a larger Response Amplitude and therefore a larger Amplitude Ratio. A shorter transient pressure pulse duration will result in a smaller Amplitude Ratio. A long transient pressure pulse duration may be detrimental to a measurement because of a number of factors, including errors due to drift in the pressure transducer(s), errors due to changes in environmental variables such as temperature and absolute pressure, errors due to time dependence of the formation sample properties, and unnecessary time taken to produce a measurement result. Too short a transient pressure pulse duration may be detrimental to the measurement in that resulting signal may be too small to analyze accurately.

Figure 5:
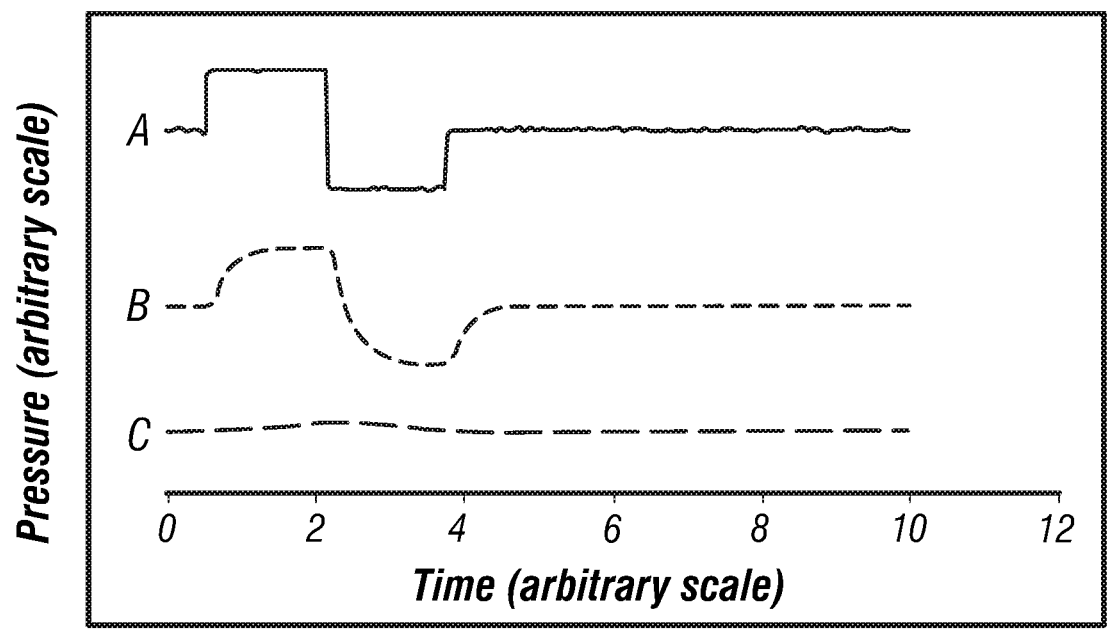
FIG. 5 shows a source pressure pulse and two pressure responses.

FIG. 5 shows examples of pressure responses for both long and short duration source transient pressure pulses. The source transient pressure pulse, shown at A, propagates through a formation sample. B and C, respectively, show the measured pressure response for the duration being too long and as per Eq. (2), wherein the Amplitude Ratio is approximately unity and at C the formation sample was of much lower permeability than the sample having pressure response shown at B. Because of the lower permeability, less of the source transient pressure pulse is able to propagate through the formation sample. Case C shows a pressure response having an Amplitude Ratio of about 0.1.

A preferred Amplitude Ratio has been determined empirically to be near 0.3. Using such Amplitude Ratio has shown consistent results in experiments using the present method. This is particularly the case for low permeability materials where the specific fluid storage of the material must also be taken into account in analyzing the measured pressure response data.

One technique for selecting and controlling an appropriate transient pressure pulse time has been developed and tested. This facilitates use of the complex transient method. The following example sequence of an experiment is described according to the present disclosure:

1. Hold pressure at the upstream end, within the sample, and at the downstream end of the formation sample at a starting pressure, i.e., in equilibrium, to provide an initial pressure on the formation sample for a selected time, X.

2. Increase the source pressure (e.g., substantially instantaneously) applied to the upstream end of the formation sample by an amount equal to ½ the chosen Source Amplitude.

3. Start time measurement when the source pressure is increased in (2).

4. Measure pressure at the other end of the formation sample.

5. When the measured pressure at the other end of the sample satisfies a first condition, e.g., increases by an amplitude Y (Y=the amplitude required to obtain a selected target Amplitude Ratio, e.g., 0.3), stop measuring time. The elapsed time may be referred to as the Pulse Time.

6. Decrease the source pressure substantially instantaneously by the full Source Amplitude (i.e., twice the amount by which the pressure is increased in (2)) at the time the first condition is satisfied.

7. Hold the decreased source pressure in (7) for a time equal to the Pulse Time.

8. Increase the source pressure substantially instantaneously by ½ the Source Amplitude). The source pressure will then be at the starting pressure in (1).

9. Hold the pressure in (8) for a time equal to 4×Pulse Time. This allows time for the pressure at the downstream end of the formation sample to reach equilibrium again. Measuring pressure at the second end of the sample is repeated during (9) and permeability of the formation sample is determined from the change in pressure at the first end of the sample, the Pulse Time and the measured values of the pressure with respect to time at the second end of the sample.

More advanced logic may be added to a source pressure control system such as may be included in an apparatus according to FIG. 1 to more precisely make measurements for formation samples that have high specific storage such as samples with high porosity. High specific storage may lead to a phase delay in the pressure response because of the storage volume in the formation sample is large enough to influence the pressure response during the measurement.

That is, even after item (4) of the above example procedure and item (6) have been performed, the measured pressure at the second end of the sample may continue to increase for a short amount of time. Therefore in a high porosity sample, when items (4) and (6) are performed, the Amplitude Ratio may be greater than 0.3. It may be desirable to investigate for indications of high sample porosity (and/or high specific storage) and adjust the procedure, e.g., the Pulse Time in such cases so that the Amplitude Ratio is at a desirable level considering both the permeability and specific storage of the sample.

In some embodiments, the first condition may be determined to be satisfied by comparison of measured fluid pressure at the second end of the formation sample with a prediction of the time history of pressure at the second end of the formation sample using a mathematical model relating permeability of the formation sample to an expected pressure at the downstream end of the formation sample with respect to time. In some embodiments, the mathematical model may also be related to specific storage of the formation sample.

In some embodiments, the second condition may be determined to be satisfied when measured pressure at the second end of the formation sample no longer changes after making the first pressure change and the second pressure change at the first end of the formation sample.

An extension of the present example implementation may be to analyze the results of a partial measurement during the measurement process to determine characteristics of the remainder of the measurement sequence that will optimize detection of permeability and specific storage. In such a case, both the Pulse Time of the transient pressure pulse and the time history (or shape) of the transient pressure pulse may be modified to optimize the measurement process.

Although only a few examples have been described in detail above, those skilled in the art will readily appreciate that many modifications are possible in the examples. Accordingly, all such modifications are intended to be included within the scope of this disclosure as defined in the following claims.

What is claimed is:

1. A method for determining permeability of a sample, comprising:
   maintaining a starting pressure at a first end and a second end of the sample;
   causing a first change in pressure at the first end of the sample and starting a time measurement;
   measuring pressure at the second end of the sample until the measured pressure changes by a predetermined fraction of the first change in pressure;
   stopping the time measurement;
   determining a time duration between the starting time measurement and the stopping time measurement;
   causing a second change in the pressure at the first end of the sample;
   maintaining the second changed pressure at the first end of the sample for the determined time duration;
   maintaining the pressure at the first end of the sample at an ending pressure and holding the ending pressure at the first end of the sample and repeating measuring pressure at the second end until a predetermined condition is satisfied; and
   determining permeability from the changes in pressures at the first and second ends of the sample.

2. The method of claim 1 wherein the first change in pressure approximates a constant value.

3. The method of claim 1 where the ending pressure is the same value as the starting pressure.

4. The method of claim 1 where the second change in pressure as a function of time is identical to the first change in pressure as a function of time multiplied by −1.

5. The method of claim 1 wherein the predetermined fraction is determined by comparing the measured pressure at the second end with a prediction of pressure at the second end using a mathematical model relating permeability to the prediction of pressure at the second end with respect to time.

6. The method of claim 5 where the mathematical model is also related to specific storage of the formation sample.

7. The method of claim 1 wherein the predetermined condition is satisfied when the observation that the pressure measured at the second end no longer changes after the first and second pressure changes, and the ending pressure has been established.

8. The method of claim 7 wherein the second change in pressure is by an amount equal to a predetermined source amplitude and wherein the second change in pressure is opposite in magnitude to the first change in pressure.

9. The method of claim 1 where the predetermined condition is a predetermined value of time duration.

10. The method of claim 1 wherein the first change in pressure is by an amount equal to one half of a predetermined source amplitude.

11. A method for determining permeability of a sample, comprising:
    maintaining a starting pressure at a first end and a second end of the sample;
    causing a first change in pressure at the first end of the sample and starting a time measurement;
    measuring pressure at the second end of the sample until the measured pressure satisfies a first condition;
    stopping the time measurement;
    determining a time duration between the starting time measurement and the stopping time measurement;
    causing a second change in the pressure at the first end of the sample;
    maintaining the second changed pressure at the first end of the sample for the determined time duration;
    maintaining the pressure at the first end of the sample at an ending pressure and holding the ending pressure at the first end of the sample and repeating measuring pressure at the second end until a second condition is satisfied, wherein the starting pressure is the same as the ending pressure; and
    determining permeability from the changes in pressures at the first and second ends of the sample.

12. The method of claim 11 wherein the first change in pressure approximates a constant value.

13. The method of claim 11 where the first condition is satisfied when the measured second pressure exceeds a selected value.

14. The method of claim 11 where the second change in pressure as a function of time is identical to the first change in pressure as a function of time multiplied by −1.

15. The method of claim 11 where the first condition is satisfied by comparing the measured pressure at the second end with a prediction of pressure at the second end using a mathematical model relating permeability to the prediction of pressure at the second end with respect to time.

16. The method of claim 15 where the mathematical model is also related to specific storage of the formation sample.

17. The method of claim 11 where the second condition is satisfied when the observation that the pressure measured at the second end no longer changes after the first and second pressure changes, and the ending pressure has been established.

18. The method of claim 11 where the second condition is a predetermined value of time duration.

19. The method of claim 11 wherein the first change in pressure is by an amount equal to one half of a predetermined source amplitude.

20. The method of claim 19 wherein the second change in pressure is by an amount equal to a predetermined source amplitude and wherein the second change in pressure is opposite in magnitude to the first change in pressure.

* * * * *